March 29, 1966  S. SMITH  3,242,596
COMBINATION OF LEARNING MATERIALS AND SELF-SCORING TESTS
Filed March 18, 1965  4 Sheets-Sheet 1

INVENTOR
Samuel Smith
BY Polachek & Saulsbury
ATTORNEYS.

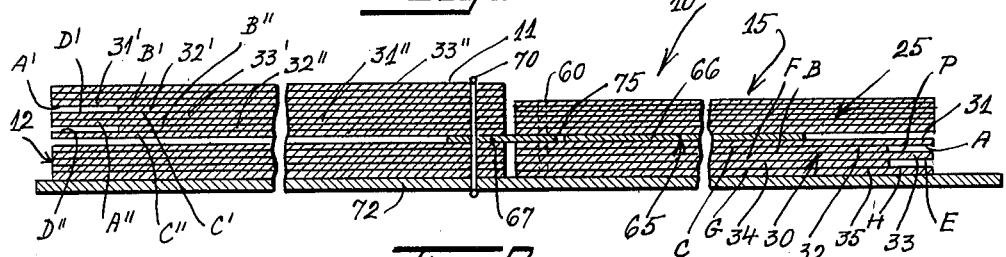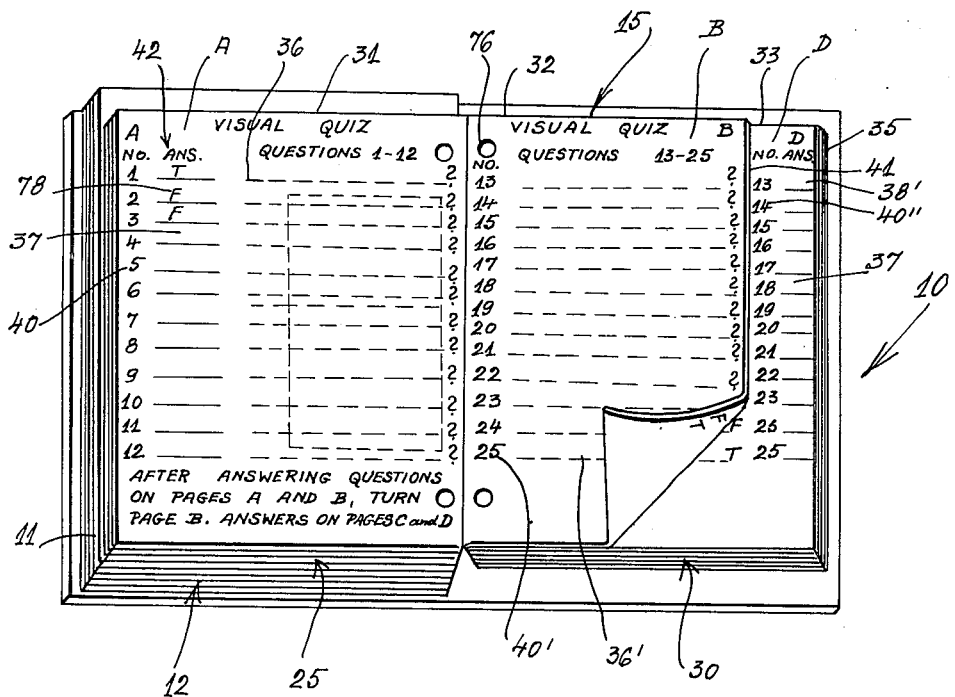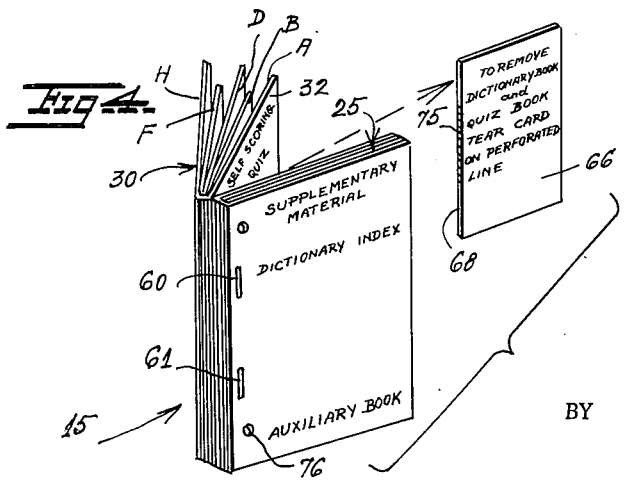

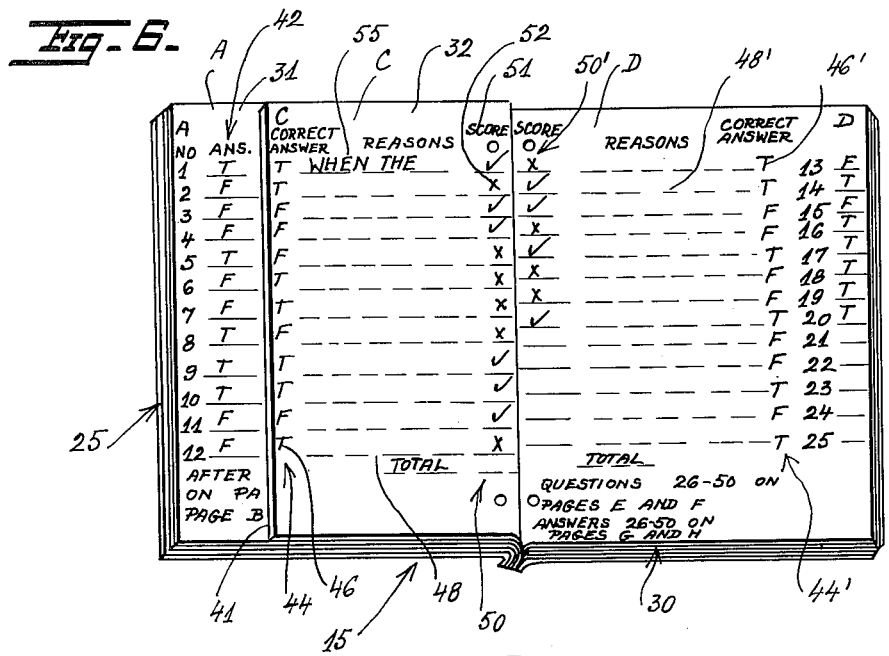
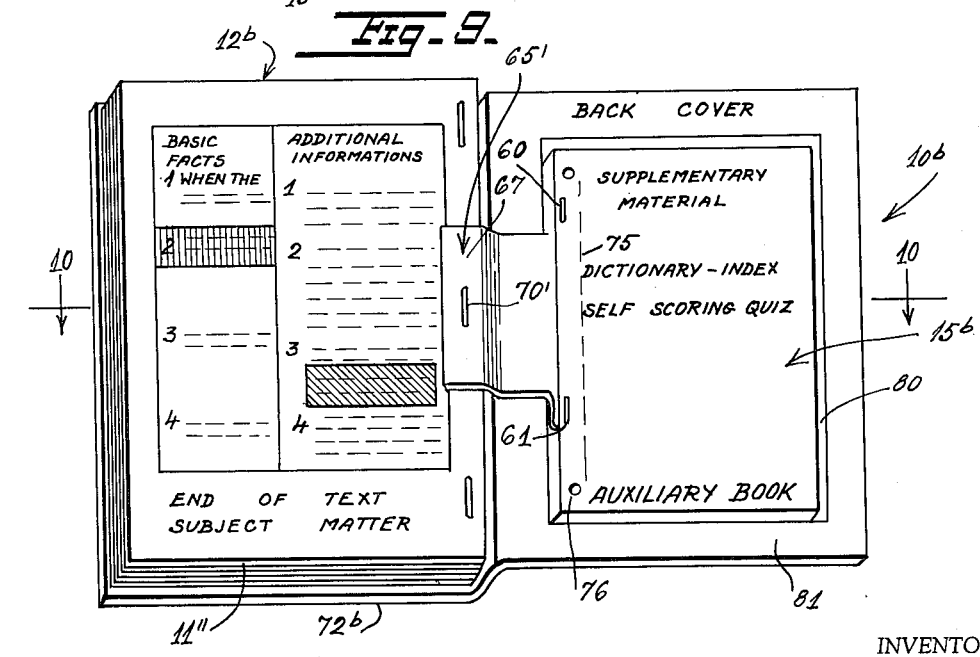

March 29, 1966 S. SMITH 3,242,596
COMBINATION OF LEARNING MATERIALS AND SELF-SCORING TESTS
Filed March 18, 1965 4 Sheets-Sheet 4
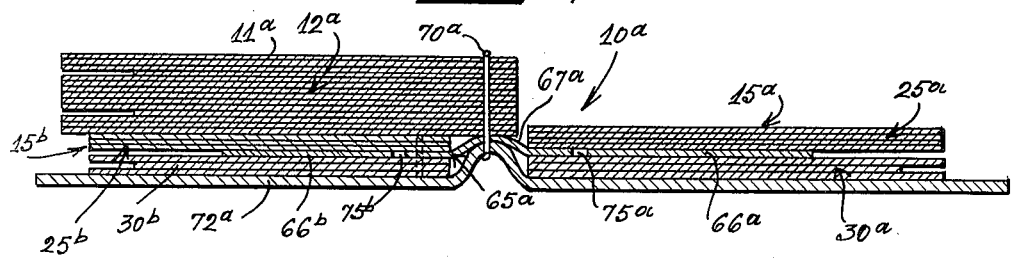
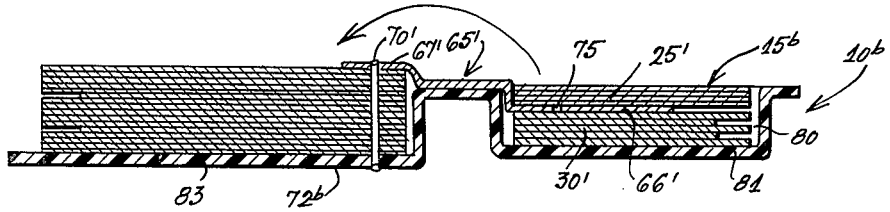
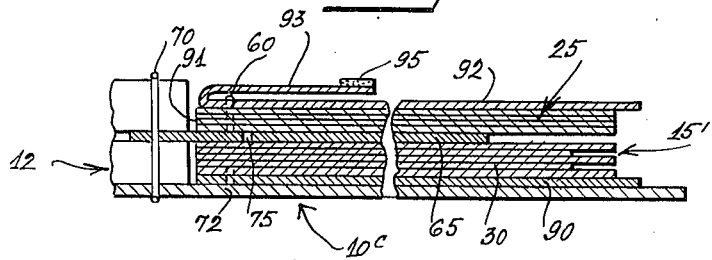
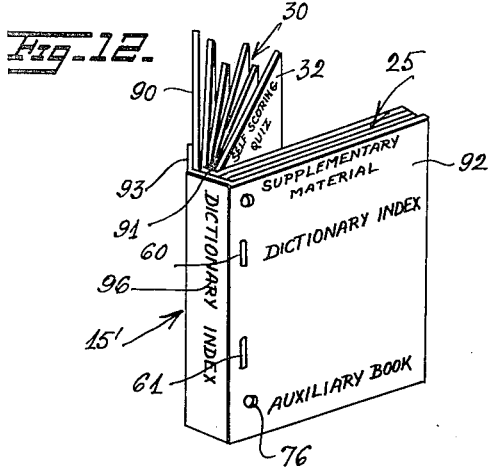
INVENTOR
Samuel Smith
BY
ATTORNEYS.

United States Patent Office 3,242,596
Patented Mar. 29, 1966

3,242,596
COMBINATION OF LEARNING MATERIALS AND
SELF-SCORING TESTS
Samuel Smith, R.D. 1, Box 220, Monroe, N.Y.
Filed Mar. 18, 1965, Ser. No. 440,698
10 Claims. (Cl. 35—48)

The present invention involves a combination of learning materials and self-scoring tests providing a system of study intended to increase the rate and depth of a student's understanding of any school or college subject. The invention includes at least two books, one or more of the books being easily detachable, with learning materials and testing materials all arranged in an integrated system.

In a main book, the subject matter of a specific field of knowledge is presented in two columns on each page. In a narrow first column the basic facts of a topic are stated and briefly explained. In a wider second column located to the right of the first column on each page, the same topic is further elaborated in greater detail and depth. The student may thus study the text of each vertical column alone. Then the student may restudy each topic horizontally, first reading a paragraph of basic facts and then a parallel detailed discussion of the topic. In this way the student will obtain both an over-all understanding of basic information and an understanding of as much detailed information as he desires. Type sizes may be varied within each column and from one column to others. Also the width of each column can be varied to permit adequate explanation of each topic. The most significant sentences or paragraphs may be emphasized by use of underlining, capitalization, differently colored printing inks, color tinted areas, etc.

After studying a number of pages of text information in this manner the student can then make use of self-scoring quizzes or tests which may be printed on differently colored stock. The tests may be short-answer type such as multiple-choice, true-false, etc. The first quiz may present questions based on the narrow columns setting forth basic facts. The second quiz may present questions based on the additional detailed information of the second wider columns. The student is instructed to write his answers in the margins of the test pages at designated places on numbered lines corresponding to numbered questions. The test pages are labeled with the letters of the alphabet: A, B, C, D, etc. The second and third pages (B, C, for example in the first quiz) are narrower than the first and fourth pages (A, D). After the student inserts his own answers on the numbered lines in the margins of the wide pages, he turns the narrow sheet of pages B, C so that the printed answers appear on the left margin of page C adjacent to his written answers on page A, aligned with them for quick comparison. Correct answers are also printed on page D and these are exposed when page B is turned, so that he can readily compare them with the remainder of the answers he has written on page D on the numbered lines.

Adjacent the printed answers are explanations. If the student has answered a question incorrectly, he need only study the explanation printed on the page containing the printed answer, since each question and answer are identically numbered. The first few words of each question and answer may be identical and printed in bold-faced type, enabling the student to perceive at a glance the precise difference between a correct answer and any incorrect answer he may have written.

Since there is a unique and economical alignment of questions and answers on the wide and the interleaved narrow sheets, numerous sets of these self-scoring tests can be incorporated within a book as a method of rapid yet comprehensive mastery in this learning system. No clips, folds, perforations, fasteners, or other mechanical devices other than the structurally variant sheets are required. Thus, for each topic in a textbook, the student is enabled to concentrate attention on those elements deemed most important, particularly those which he has not as yet correctly understood as indicated by the self-scoring quizzes. The book is held and used in the customary manner and requires no tearing or folding of pages, thus differening in a supperior way from the self-corrective detachable sheets described in my prior Patent 2,246,700.

In a second auxiliary book detachably secured to the first main book, there may be provided a dictionary-index of the subject being studied. This subject will be the same as that discussed in the main book. The dictionary-index presents important names, terms, principles, facts, and other data arranged in alphabetical order and very briefly explained, each entry being followed by page cross-references to the relevant discussion of the entry in the main book. The auxiliary book will include at least two printed sections consisting of 8, 16, 24, 32, 64 or similar convenient groups of pages stapled or sewed or otherwise fastened at the side, with the top and bottom sections having either self-covers or other covers.

A card is inserted between any pair of sections, thus separating them. The card passes between the staples or other fasteners or stitches and is bound firmly into the main book. The card is so shaped that at the right of the staples (or other fasteners) it extends upward some distance and also downward some distance (above and below the staples or other fasteners, respectively) and in this way holds the auxiliary book firmly in place so that it acts as a unit with the main book. The card holding the auxiliary book in place is perforated or scored or otherwise made easily tearable at its left edge close to the binding of the main book and between the sections within the auxiliary book. By tearing this card as indicated, along the perforations or otherwise along the edge close to the binding, the student can easily remove the entire auxiliary book as a complete self-contained volume. In the same manner, additional detachable books can easily be inserted and bound together as a set or group of removable books, each designed to fill a specific learning need. Other fastener means can be used instead of cards to hold the detachable books in place until it is desired to remove them.

In a modification of the foregoing described arrangement of materials, two or more small-sized booklets can be inserted, one above the other, bound into a main volume by means of a perforated card or other similar simple connection, such as a tape. Thus there will be within a complete volume (or kit), a set of booklets of various sizes, each designed for a special learning purpose and each detachable for separate convenient use by the student.

The pages constituting the auxiliary book may be provided with suitable punched holes so that the student can at any time he chooses detach and insert the auxiliary book into his personal notebook (or ring binder) for quick-reference purposes during attendance at lectures or elsewhere. Also contained with the auxiliary book are self-scoring examinations of the same general type and using the same structural system as in the main book. The first of these examinations deals with the most important entries in the dictionary-index by using true-false questions. The second examination may make use of multiple-choice questions dealing with selected ideas and terms of the dictionary-index. The third examination may cover a cross-section of the entire subject being studied. Here, following each answer there may be inserted a cross-reference to the page in the main book where the same topic is explained.

Heretofore, there was no device available to enable the student satisfactorily to distinguish readily between less important and more important elements and topics of the subject being studied. By use of tinted areas in the main book, in conjunction with the results of his work on the final, comprehensive examination in the auxiliary book, the student will be able to note at once which, if any, of his errors were made in connection with the vitally important tinted sentences and tinted paragraphs of the text explanations in the main book. He will thus be guided to concentrate immediately upon the topics and points of information considered most urgent and important in the light of his interests and needs.

The remainder of the detachable auxiliary book will be provided with additional quick-reference materials, such as charts, formulae, tables, dates, sources, study hints, and other aids so far as possible within the space available. Additional detachable booklets containing such materials or other quick-reference or study aids can be inserted in a similar way.

Since the structural devices together with the arrangement of the text materials and accompanying tests and dictionary-index constitute a comprehensive, time-saving yet flexible and complete tool of education, it is believed that the student's efficiency in learning will be substantially aided thereby, not only in private study of any subject but also during attendance at lectures and during the preparation of documented papers, research reports, theses, and the like.

This system of learning must not be confused with programmed texts or teaching machines which attempt to dissect a topic and require the learner to manipulate a great number and variety of pages, mechanisms, or devices. Here the emphasis throughout is placed upon overviews of major principles, followed by a unique method of study in depth for each topic, rapid self-checking devices, and convenient quick-reference aids to increase the practical efficiency of learning.

In a further important modification of the detachable-books device, a card, sheet, tape, or other type of fastener or holder can be inserted and bound into the main book and shaped as to extend both to the left and to the right of the spine of the main book, thence extending between staples or stitches in removable booklets. Such a card, or sheet, or tape, etc. will then hold firmly any and all additional booklets placed in the front or back of the main book. Several cards, sheets, tapes, etc. may be used for holding purposes similarly as needed.

With one or more booklets being held firmly between the front cover and first page of the main book, and also with one or more booklets being held firmly between the back cover and last page of the main book, each set of materials is available as a removable unit. The card or other means of holding the booklets firmly will contain perforations, scoring, or other means of being easily torn and detached, whereupon the booklet or booklets will also be readily removable. Several perforated cards, sheets, or tapes, etc. can be similarly inserted to keep removable books in place in various other portions also of the main book in addition to those booklets placed in the front and back sections.

In a further modification and refinement, to facilitate economical and efficient binding of the main book in order to accommodate removable booklets, the outside covers of the book can be constructed of a rigid or semi-rigid material, such as plastic material as an example, which can be shaped to provide a recess or empty space into which the removable booklet or booklets can be inserted and kept firmly in place until such time as the reader wishes to remove any or all of the complete units. In this way the binder will need to make little or no adjustment in this method of binding the main book to accommodate these removable books or booklets when the latter are placed in the recesses of the front or the back portions of the covers of the main book.

The binding devices and methods here presented differ markedly from customary use of merely perforated pages in widely used textbooks. Perforated single pages may be detached but they cannot be utilized as a combined unit readily, they are difficult to handle, keep in order, or manipulate, and they do not lend themselves to efficient learning procedures such as are required by this integrated system of learning. The present devices here presented provide a novel means whereby students can obtain multiple books within a single book or connected with and bound in with a single book or together, and can make use of the various sections or complete units as a single bound volume (including two or more other volumes) until such time as their learning situation and needs call for removal and separate use of one or more of the detachable books. An example of the unique value of the devices presented is offered by the recommendation to the student that he study an elementary booklet at various times during his reading of a main text section, then detach the elementary section for separate review prior to study of other topics in the main text. Some of the removable units can be made small enough to fit easily into the student's pocket or purse, others large enough to fit into class notebooks or spring binders. The flexibility and integration of the learning system and devices presented are expected to contribute substantially to the efficiency of study and learning.

In a further modification of the detachable books device, a card, sheet, tape, or other type of simple fastener or holder can be inserted and bound into another booklet, magazine, section, or book to extend between staples or stitches or other fasteners of the removable unit so that all portions will be held firmly together. Here the front cover of the detachable portion or portions will be folded over to the right and the folded portion will be gummed or supplied with an adhesive along its entire length. When the reader detaches the removable book or section, he can then moisten the flap and turn it under, pressing it firmly against the back cover so that a completely covered separate booklet, book, or neat section will result, comparing favorably with the customary book or magazine in appearance. Thus with a minimum of effort the reader can detach and quickly obtain completely covered books or booklets which will fit well and harmonize with other books or journals in his possession, in his bookcase, or on shelves. This procedure will leave no torn pages or open spaces to mar the appearance of the books or booklets detached. The inserts handled in this manner would be particularly attractive and convenient for use with periodicals, advertising booklets, and the like, as well as for use with textbooks, reference books, anthologies, combined digests of books, and books with records or record albums bound into them in this manner.

To summarize then, a principal object of the invention is to provide a self-educational device including a main text book having text material arranged in vertical columns of basic facts and detailed additional information respectively, with one or more auxiliary books or booklets having material supplementing the material of the main book, the auxiliary books being removably attached to the main book, and with self-scoring and self-correcting examination pages provided in each of the books.

A further object is to provide a self-educational device as described, wherein the examination pages are arranged in sets of four alternately wide and narrow pages, with the wide pages having marginal spaces provided for writing in answers to questions appearing on one wide page and one narrow page, with printed answers to the questions along the explanatory material on the other narrow page and other wide page.

Still another object is to provide a self-educational device as described, wherein certain key sentences and paragraphs in the main text book are identified by tinted areas, coordinated with subject matter in the questions and/or answers on the examination pages.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 3 is an enlarged sectional view taken on line 3—3 of FIG. 2, parts being broken away.

FIG. 4 is a reduced perspective view of an auxiliary book removed from the assembly of FIG. 1, with part of the severed holding card.

FIG. 5 is an oblique plan view of the book assembly of FIG. 1 with examination question pages exposed.

FIG. 6 is an oblique plan view of the book assembly of FIG. 1 with answer pages exposed.

FIG. 7 is a sectional view similar to FIG. 3, showing a modification of the invention.

FIG. 8 is a plan view of the attachment card employed in book assembly of FIG. 7.

FIG. 9 is an oblique plan view of another book assembly.

FIG. 10 is a sectional view taken on line 10—10 of FIG. 9.

FIG. 11 is a fragmentary sectional view similar to a part of FIG. 3, illustrating a modification of the invention.

FIG. 12 is a perspective view similar to FIG. 4, showing the auxiliary book taken from the assembly of FIG. 11.

Figure 1:
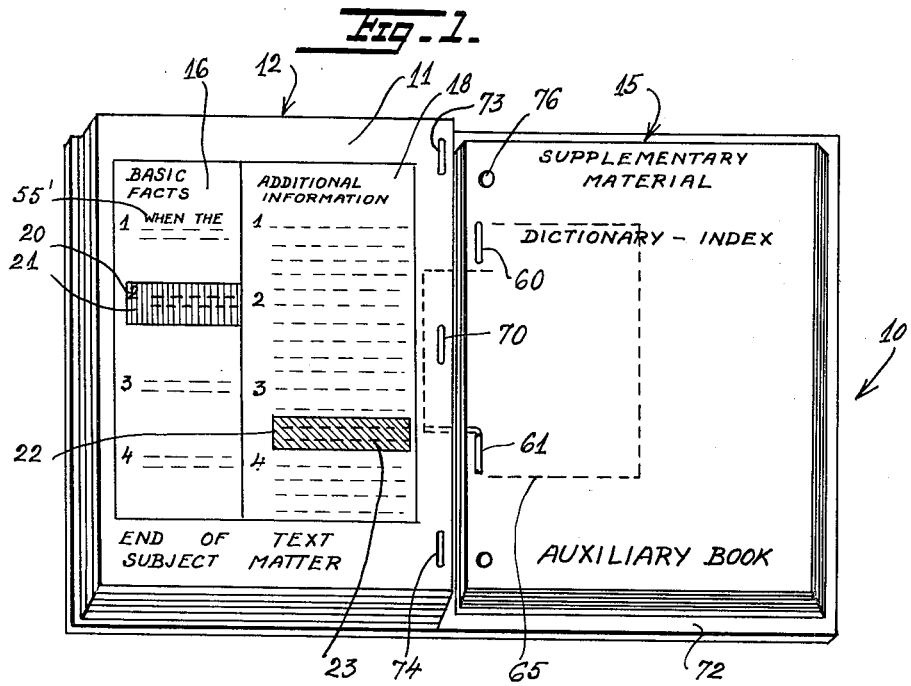
FIGURE 1 is an oblique plan view of a book assembly embodying one form of the invention, with main book and auxiliary book exposed.
Figure 2:
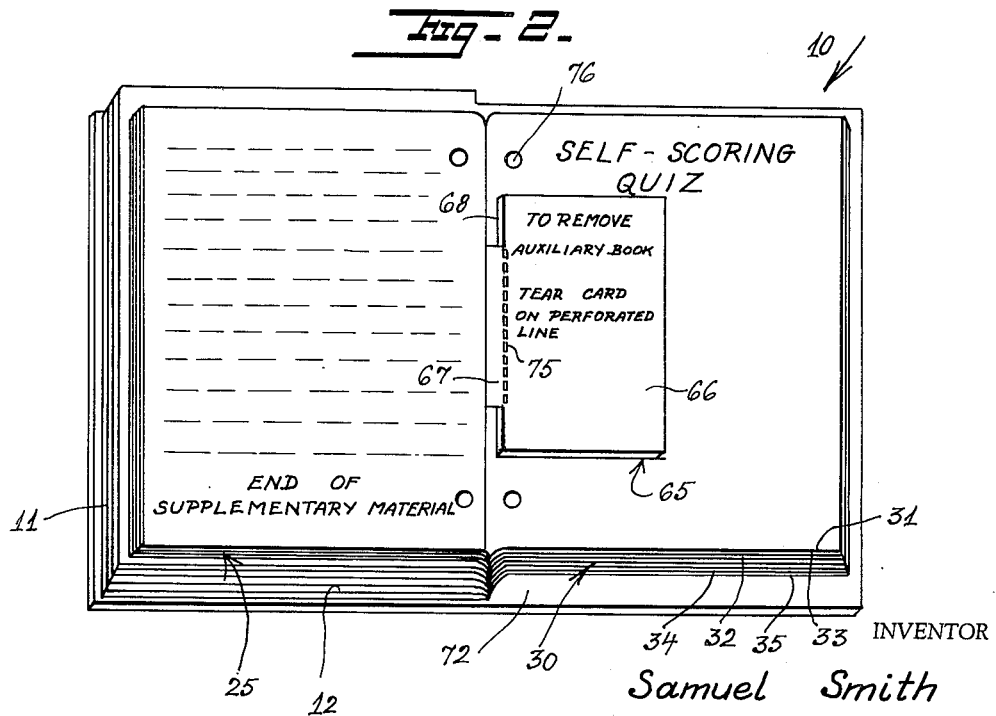
FIG. 2 is another oblique plan view of the book assembly of FIG. 1, with auxiliary book sections exposed.

Referring first to FIGS. 1-6, there is shown a book assembly 10 including a main book or volume 12 and an auxiliary book or volume 15. The main book has pages 11 of text material explanatory of a certain subject. Each page 11 of the main book as clearly shown in FIG. 1 is divided into a narrow left vertical column 16 and an adjacent wider right column 18. In narrow column 16 basic facts of the subject are explained. In the wider right column 18 detailed additional explanatory information appears for each of the itemized basic facts in column 16. Certain areas 20 and 22 in the several columns may be tinted different colors such as pink, blue, green, etc. In these tinted areas sentences and paragraphs 21, 23 appear which describe key information of particular importance which the student must learn to obtain a complete grasp of the subject presented in the main book.

The auxiliary book 15 contains supplementary material. It may for example have one section 25 containing a dictionary or glossary of terms, an index of subject matter, an outline of subject matter in the main text of book 12, etc.

In another section 30 of the auxiliary book are two or more sets of examination sheets or pages intended to test the student's knowledge of the entire subject matter of the main text. The arrangement of the examination sheets is best shown in FIGS. 3-6. Alternating with wider sheets 31, 33, 35 having pages designated A, D, E, H are narrower sheets 32, 34 having pages designated B, C and F, G. On page A are numbered questions 36. Adjacent each of the questions is an underlined blank area 37 which have short answers 38 which can be written by the student. A column of numbers 40 appears adjacent to the blank answer column 42.

On the narrow page designated B is another column of numbers 40′ in continuation of numbers 40 and a further series of questions 36′. Adjacent the free edge 41 of sheet 32 appears a further column of numbers 40″ on page D of sheet 33 respectively corresponding to and aligned with numbers 40′ on page B. Adjacent to numbers 40″ is another column of underlined blank areas 37′ in which short answers 38′ to questions 36′ can be written.

FIG. 5 shows sheet 32 partially turned and in FIG. 6 the sheet is fully turned. Now edge 41 of sheet 32 is adjacent to answer column 42. Adjacent to edge 41 on page C is a printed column 44 of answers 46. Model long form answers, further explanatory information or other data 48 may appear adjacent each of the printed answers. A column 50 of underlined blank areas may appear at the right margin of page C in which the student can write, check or cross marks 51, 52 representing a correct or incorrect score respectively for each answer written in column 42. If any written answer is incorrect, the student can refer back to the index information in section 25 where there will be a reference to the page of the next in the main book 12 in which the subject matter was explained. The student will be especially careful to learn the vital information appearing in tinted areas 20 and 22 of the main text if he discovers that he has incorrectly answered a question pertaining to this vital information.

When page D is fully exposed upon turning of sheet 32, there is exposed a column 44′ of printed answers 46′ adjacent to the answers 38′ written in by the student in the right marginal column of page D. The reasons for the printed answer or other explanatory information or data 48′ appears adjacent to column 44′. A further blank score column 50′ appears at the left margin of page D.

Similarly pages E-H will be arranged like pages A-D respectively. This will constitute two complete examinations or tests. Further sets of four pages can be provided for additional tests. If desired one test or series of tests can pertain only to the basic facts covered in the narrow columns 16 of the main text. Another test or series of tests can pertain only to the additional information in the wider columns 18. Still another test or series of tests can pertain to the supplementary information appearing in the first section 25 of the auxiliary book 15.

If desided tests arranged like those just described and illustrated can be provided in one or more places in the main text. Thus as indicated in FIG. 3, narrow sheet 32′ is placed between wider sheets 31′, 33′, and narrow sheet 32″ is placed between wider sheets 31″, 33″. Quiz pages A′-D′ appear on sheets 31′-33′ and quiz pages A″-D″ apear on sheets 31″-33″. Their arrangement is identical to those identified by corresponding unprimed numbers and letters in the auxiliary book.

Thus, the student can conduit a self-examination. His examination is self-scoring. He can locate the text material pertaining to incorrectly answered questions. If desired initial words in the explanatory information on pages C and D can be identical to the initial words on the corresponding basic information. Thus as indicated in FIG. 5 the first words 55 of the explanation of the printed answer to question No. 1 are identical to the first words 55′ appearing in the basic facts of item No. 1 on text page P shown in FIG. 1.

The auxiliary book 15 is detachably secured to main book 12. The manner of attachment is illustrated in FIGS. 1-4. The pages of auxiliary book 15 are secured together by two spaced staples 60, 61 at the left edge of the book. A T-shaped card 65 having a rectangular body portion 66 and a tongue 67 extending laterally from edge 68 of body portion 66 serves as holding member.

The body of the card is located between sections 25 and 30 of book 15. Tongue 67 extends laterally to the left and is inserted between two sections of main book 12. A staple 70 is inserted through the pages 11 of the main book and tongue 67 in the main book. The staple may also extend through rectangular cover 72 applied to the main book. Additional corner staples 73 and 74 may secure the pages of the main book together and these staples may engage cover 72 also.

Card 65 has a line of perforations 75 aligned with edge 68 of the card body 66. As shown in FIG. 4, the card body 66 can be torn free along perforations 75, and the tongue 67 can then be withdrawn from between sections 25, 30 to free the auxiliary book. The auxiliary book may have holes 76 near its corners which can engage rings in a looseleaf book or binder (not shown), kept by the student for notes, reports, etc. It will be noted that the spacing of staples 60, 61 is less than the length L of card body 66 so that the card cannot slip past the staples unless the card is torn at perforations 75. Book assembly 10A shown in FIG. 7 employs another holding card 65a.

Book assembly 10A shown in FIG. 7 has main book 12a and two auxiliary books 15a, 15b. The auxiliary books are held between right and left sections respectively of cover 72a by an attachment or holding card 65a shown best in FIG. 8. This card has a tongue 67a bridging or connecting two rectangular body sections 66a, 66b of the card. Staple 70a extends through the tongue 67a, book pages 11a and center portion of cover 72a. Either one of the auxiliary books can be detached from the book assembly by tearing the card on either perforations 75a or 75b at opposing edges 68a, 68b of the card where tongue 67a terminates. Spaced staples 60a and 60b attach the sheets of respective books 15a, 15b together. The spacing of staples is less than the width of the card bodies inserted between book sections 25a, 30a and 25b, 30b so that neither auxiliary book can slip away from the holding card. The auxiliary books have explanatory material sections 25a, 25b and test sections 30a, 30b arranged as described in connection with auxiliary book 15 of book assembly 10.

Book assembly 10B shown in FIGS. 9 and 10 is similar to book assembly 10 and corresponding parts are identically numbered. In this book assembly, cover 72b is made of flexible plastic material. A deep rectangular recess 80 is formed in the back cover section 81 and the auxiliary book 15b is inserted in this recess. Card 65' has body 66' inserted between sections 25' and 30' of book 15b and prevented from slipping out of these sections by staples 60, 61 which hold the pages of the auxiliary book together. When the perforations 75 of the card are torn, the tongue slips out of the auxiliary book. If desired the tongue can be torn free from the holding staple 70' binding the pages 11' of the main book 12b together.

When the book assembly 10B is closed, the auxiliary book is wholly concealed inside the cover. Nevertheless the auxiliary book is exposed when the cover is opened so that access is had to the sheets of the explanatory and examination sections 25', 30'.

If desired a further recess can be made in the front cover section 83 of the cover to insert another auxiliary book like book 15b therein. Instead of staples other fastener means can be used such as tapes, stitching, etc. The attachment cards could also be replaced by other equivalent book holders.

In FIG. 11 is shown another book assembly 10c which is similar to book assembly 10 of FIG. 3 and corresponding parts are identically numbered. The auxiliary book 15' held by connecting card 65 is provided with a back cover 90 and a front cover 92. The cover 92 has a folded flap 93 which is free from staples 60, 61. This flap has a free margin coated with a suitable adhesive 95. When the auxiliary book 15' is removed from the book assembly as shown in FIG. 12, the flap 93 can be folded around the exposed bound edges 91 of the pages of the auxiliary book to conceal them. The adhesive coated margin of the flap can be moistened and secured to the outer side of the back cover. This forms a neat appearing bound book. If desired the title 96 of the auxiliary book can be applied to the flap 93 so that when the flap is in place as shown in FIG. 12, this title is exposed. The bound auxiliary book will fit in well with and harmonize with other books or bound journals in a bookcase or on a bookshelf. The binding flap 93 strengthens the entire book structure so that it has a longer and more useful life.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; at least one auxiliary book, means detachably securing the auxiliary book to the main book, said auxiliary book having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets, for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page.

2. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; at least one auxiliary book, means detachably securing the auxiliary book to the main book, said auxiliary book having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page, certain ones of the brief statements and the longer detailed statements being located at colored areas in said columns to indicate vital points of said subject.

3. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; at least one auxiliary book, means detachably securing the auxiliary book to the main book, said auxiliary book having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page, certain ones of the brief statements and the longer detailed statements having initial wording identical to wording of said explanatory material to facilitate location and identification of said certain statements.

4. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; at least one auxiliary book, means detachably securing the auxiliary book to the main book, said auxiliary book having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page, said auxiliary book having two sections one of the sections containing explanatory material relating to the subject of the main book, the other section containing said sets of examination pages, said means for detachably securing the auxiliary book to the main book comprising a T-shaped card having a rectangular body portion and a tongue extending outwardly of said body portion at one edge thereof, means securing said tongue to the bound sheets of the main book, and spaced fasteners securing said two sections together, said fasteners being located near opposite edges of said tongue near said one edge thereof, said body portion being interposed between said two sections and being kept from slipping out of the auxiliary body by said spaced fasteners, whereby said auxiliary book is released when said tongue is severed.

5. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; at least one auxiliary book, means detachably securing the auxiliary book to the main book, said auxiliary book having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page, said auxiliary book having two sections one of the sections containing explanatory material relating to the subject of the main book, the other section containing said sets of examination pages, said means for detachably securing the auxiliary book to the main book comprising a T-shaped card having a rectangular body portion and a tongue extending outwardly of said body portion at one edge thereof, means securing said tongue to the bound sheets of the main book, and spaced fasteners securing said two sections together, said fasteners being located near opposite edges of said tongue near said one edge thereof, said body portion being interposed between said two sections and being kept from slipping out of the auxiliary body by said spaced fasteners, whereby said auxiliary book is released when said tongue is severed, and a cover secured to the main book, said cover having a rectangular recess therein, said auxiliary book being seated in said recess so that the auxiliary book is concealed when the cover is closed.

6. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; two auxiliary books, means detachably securing said auxiliary books to opposite sides of said main book, each of the auxiliary books having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page.

7. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; two auxiliary books, means detachably securing said auxiliary books to opposite sides of said main book, each of the auxiliary books having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answer on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page, each auxiliary book having two sections, said means detachably securing the auxiliary books to the main book comprising a card having two rectangular body portions with a narrow tongue connecting said body portions at spaced opposing edges of said body portions, means securing said tongue to the main book, and spaced fasteners securing the two sections of each auxiliary book together, said fasteners being located near opposite edges of said tongue near the opposing edges of the rectangular body portions, said body portions being interposed respectively between the sections of the respective auxiliary books and kept from slipping out of the auxiliary books by the spaced fasteners, whereby either auxiliary book is separated from the main book when one of the body portions of the card is severed from the tongue.

8. A book assembly, comprising a main book having a plurality of sheets bound together, said main book having adjacent narrow and wide vertically extending columns on each of a number of pages thereof, the narrow columns containing brief statements of basic facts relating to a certain subject, the wide columns containing longer statements of more detailed information relating respectively to the brief statements; at least one auxiliary book, means detachably securing the auxiliary book to the main book, said auxiliary book having a plurality of other sheets bound together, said other sheets including sets of examination pages, each of said sets including first and fourth facing pages on two of said sheets respectively, an intermediate third sheet having opposite second and third pages, said third sheet being narrower than said two sheets and interposed between said two sheets for exposing marginal portions of said first and fourth pages when the auxiliary book is opened at said two sheets, said marginal portions each having a vertical column of underlined answer areas for insertion of short answers thereon, numbered questions on the first page aligned horizontally with the answer areas on the first page, numbered questions on the second page aligned with the answer areas on the fourth page, printed answers on the third page aligned with the answer areas on the first page, printed answers on the fourth page aligned with the answer areas on the fourth page, the answers on the third and fourth pages being normally concealed by the third sheet and exposed when the third sheet is turned over the first page, and areas containing explanatory material adjacent to the printed answers respectively on the third pages normally concealed by the third sheet when the third sheet is turned over the fourth page, said auxiliary book having two sections, one of the sections containing explanatory material relating to the subject of the main book, the other section containing said sets of examination pages.

9. A book assembly comprising a main book having a plurality of sheets bound together, said book having statements relating to a particular subject matter, an auxiliary book having two sections, one of said sections including a dictionary and index of the subject matter of the main book, the other of said sections having self-scoring examination sheets, and a generally T-shaped card, said card having a rectangular body portion and a tongue extending outwardly of said body portion at one edge thereof, means securing said tongue to the bound sheets of the main book, and spaced fasteners securing said two sections together, said fasteners being located near opposite edges of said tongue near said one edge thereof, said body portion being interposed between said two sections and being kept from slipping out of the auxiliary book by said spaced fasteners, said card having a line of perforations between the body of the card and said tongue whereby said auxiliary book is released when said tongue is severed, front and back covers secured by said fasteners to opposite outer sides of said sections, one of said covers having a flap extending freely beyond said fasteners for folding over marginal portion of the other cover to conceal bound edges of said sections when the auxiliary book is separated from the main book.

10. A book assembly according to claim 9, wherein said flap has a gummed edge whereby it is securable to said marginal portion of the other cover.

References Cited by the Examiner

UNITED STATES PATENTS

| | | | |
|---|---|---|---|
| 390,526 | 10/1888 | Solliday | 281—17 |
| 500,482 | 6/1893 | Fowler | 129—39.5 |
| 627,076 | 6/1899 | Glover | 129—38 |
| 1,670,254 | 5/1928 | Gowin | 35—48.1 |
| 1,673,166 | 6/1928 | Studebaker | 35—48.1 |
| 2,308,628 | 1/1943 | Rider | 281—16 |
| 2,406,785 | 9/1946 | Atwood | 281—17 |
| 3,145,481 | 8/1964 | Aldershof | 35—35.5 |

EUGENE R. CAPOZIO, *Primary Examiner.*

SHELDON M. BENDER, *Assistant Examiner.*